(12) United States Patent  (10) Patent No.: US 8,457,564 B2
Champion  (45) Date of Patent: *Jun. 4, 2013

(54) DUAL-USE PORTABLE DISPLAY DEVICE

(76) Inventor: Geoffrey Champion, South Plainfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,146

(22) Filed: Nov. 9, 2011

(65) Prior Publication Data

US 2012/0057289 A1 Mar. 8, 2012

Related U.S. Application Data

(63) Continuation-in-part of application No. 12/972,605, filed on Dec. 20, 2010, now Pat. No. 8,224,406, which is a continuation-in-part of application No. 11/998,628, filed on Dec. 1, 2007, now abandoned.

(51) Int. Cl.
H04B 1/38 (2006.01)

(52) U.S. Cl.
USPC .......... 455/90.3; 345/169; 361/679.16; 361/679.3; 341/22

(58) Field of Classification Search
USPC .......... 455/550.1, 566, 575.1, 575.3, 90.2, 455/90.3; 361/679.16, 679.28, 679.2, 679.3, 361/679.09, 679.55; 345/169; 341/22; 348/14.01, 14.02
See application file for complete search history.

(56) References Cited

U.S. PATENT DOCUMENTS

| 5,278,779 A | 1/1994 | Conway et al. |
| 5,644,338 A | 7/1997 | Bowen |
| 6,047,196 A | 4/2000 | Makela et al. |
| 6,510,325 B1 * | 1/2003 | Mack et al. ............... 455/575.2 |
| 6,542,354 B1 | 4/2003 | Holtorf et al. |
| 6,894,626 B2 * | 5/2005 | Olodort et al. .................. 341/22 |
| 6,983,175 B2 | 1/2006 | Kwon |
| 6,989,984 B2 * | 1/2006 | Sutton et al. ............ 361/679.16 |
| 7,054,146 B2 * | 5/2006 | Sutton et al. ............ 361/679.28 |
| 7,107,018 B2 | 9/2006 | Jellicoe |
| 7,130,669 B2 | 10/2006 | Moon |
| 7,333,321 B2 * | 2/2008 | Sutton et al. ............ 361/679.09 |
| 7,336,979 B2 | 2/2008 | Soejima |
| 7,864,524 B2 * | 1/2011 | Ladouceur et al. ...... 361/679.55 |
| 2002/0072395 A1 | 6/2002 | Miramontes |
| 2004/0203513 A1 | 10/2004 | Kwon |
| 2005/0017953 A1 * | 1/2005 | Pekka ........................... 345/169 |
| 2005/0026658 A1 | 2/2005 | Soejima |
| 2005/0164752 A1 * | 7/2005 | Lau et al. .................. 455/575.3 |

OTHER PUBLICATIONS

Yanko Design, iWEB 2.0 Laptop Concept fold-out-laptop, Mar. 30, 2010, original date of sale unknown.

* cited by examiner

Primary Examiner — April G Gonzales
(74) Attorney, Agent, or Firm — Gearhart Law, LLC

(57) ABSTRACT

A keyboard extension for a removable, portable display device such as a cellphone that also functions to house the display device. The display device housing is shaped and sized to securely enclose the removable, portable display device. The keyboard extension may have keyboard housing panels that are substantially equal in size to the display device being removably housed. These keyboard housing panels ham be hingeably connected so that in a first configuration, the keyboard extension may function as a portable display device holder, while in a second configuration it may function as a wirelessly connected, split, full size keyboard input to the portable display. The keyboard extension may also include a numeric keypad housing panel that may be hingeably connected to either of the keyboard housing panels.

10 Claims, 3 Drawing Sheets

DUAL-USE PORTABLE DISPLAY DEVICE

CLAIM OF PRIORITY

This application claims priority to, and is a continuation in part, of U.S. patent application Ser. No. 12/972,605 filed on Dec. 20, 2010 that is a continuation in part, and claims priority to U.S. patent application Ser. No. 11/998,628 filed on Dec. 1, 2007, the contents of both of which are fully incorporated herein by reference.

FIELD OF THE INVENTION

The invention relates to keyboard extensions for portable display devices, and more particularly, to keyboard extensions that removably, but functionally, house the display device.

BACKGROUND OF THE INVENTION

Many electronic devices have common components, making dual use devices potentially a way of saving costs. Differing physical requirements, however, often make obtaining these potential savings impractical. For instance, cellular phones and personal computers (PCs) both have display screens, programmable general purpose processors and memory for storage. It would seem desirable to have an electronic device that could function both as a cellular phone and a PC by using a common display screen, a common processor and a common memory, thereby saving on hardware costs. The problem is keyboard input of text. In a PC, text input is typically facilitated by a full size key board, i.e., one the size of a typewriter keyboard, with individual keys that are sufficiently large, and spaced apart, that an average adult, skilled in the art of typing, may touch type on such a keyboard using all ten of their distal phalanges, i.e., all their fingers and thumbs.

Description of the Related Art

The relevant prior art involving dual configuration electronic devices includes:

U.S. Pat. No. 6,989,984 issued to Sutton, et al. on Jan. 24, 2006 entitled "Personal entertainment device (PED) with double-opening flap" that describes an electronic device having three substantially planar panels. The first panel has a first side edge and a second side edge, and includes a display. The second panel includes a first interface and is hingedly coupled to the first side edge of the first panel. The third panel includes a second interface and is hingedly coupled to the second side edge of the first panel. The device is configured in at least two positions. In a first position the first interface and the second interface are obscured and in a second position the first interface and the second interface are exposed. Such a device can be a gamer with a first gaming interface and a second gaming interface, or it can be an electronic device with PDA technology through a first keyboard and a second keyboard. Alternatively, the device can be a communicator or a music player.

U.S. Pat. No. 6,510,325 issued to Mack, II, et al. on Jan. 21, 2003 entitled "Convertible portable telephone" that describes a communications and entertainment device in which a cellular telephone is unfolded to form a headset which allows the user to wear the headset in a manner similar to conventional telephone headsets. The device includes an AM/FM radio receiver. The subsystems are prioritized such that one system is automatically interrupted based on higher priority activity. A display unit allows the user to display graphic information such as facsimile data or other graphic information such as that obtained from computer networks. A speaker phone function allows the user to hear audio output while the user has the device folded into the portable telephone configuration and hand-held. An integrated camera allows the device to be used for video phone telephone calls. An integral GPS receiver is built into the device to allow the location of the device to be automatically determined. The GPS receiver can be used in conjunction with the video phone function if the device is stolen by capturing a picture of the thief while the thief is dialing the stolen telephone and relaying that information along with GPS position information to local police such that the thief may be more easily captured and the device recovered.

US Patent Publication no. 2005/0017953 by Pekka published on Jan. 27, 2005 entitled "Mobile terminal device having foldable functional cover" that describes a new way to implement bigger keyboard in basic mobile terminal devices without increasing the size. The mobile terminal device is foldable, and can be arranged in two different closed positions. A mobile terminal device according to the invention comprises a housing, at least two covers pivotably attached to said housing, and at least two different operative surfaces. The two covers are movable between at least two closed positions. The at least two different operative surfaces are arranged on different surfaces of one of the housing and/or the covers in a way that in at least one of the closed positions, one of the two different operative surfaces is located on an outer surface of the mobile terminal device in the closed position. So that a user can chose which user interface is presented to him by closing the mobile terminal device in one way or another.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to a keyboard extension for a portable display device such as, but not limited to, a cellphone or tablet that also functions to removably house the display device.

In a preferred embodiment, the display device housing may be shaped and sized to securely, but removeably, enclose a portable display device. The display device housing of the keyboard extension may, for instance, have two short sides to which keyboard housing panels may be attached. The first keyboard housing panels may be substantially equal in size to the portable display device that the display device housing may house. These connections may be hinged so that in a first configuration, the keyboard extension may function as a portable display device holder, while in a second configuration it may function as a wirelessly connected, split, full size keyboard input to the portable display.

In a further, preferred embodiment, the keyboard extension may also include a numeric keypad housing panel that may be hingeably connected to a short side of either of the keyboard housing panels.

Therefore, the present invention succeeds in conferring the following, and others not mentioned, desirable and useful benefits and objectives.

It is an object of the present invention to provide a keyboard extension that removeably holds a portable communications device.

It is another object of the present invention to provide a keyboard extension that allows functional user access in either its support configuration or in its keyboard configuration.

Yet another object of the present invention is to provide wireless functional connectivity between the removable, portable display device and the keyboard extension.

DESCRIPTION OF THE PREFERRED EMBODIMENTS

Figure 1:
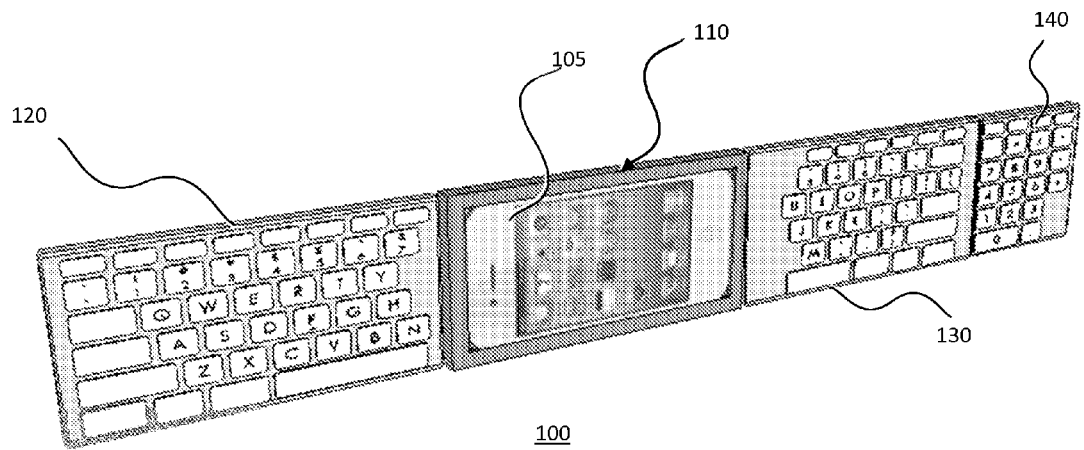
FIG. 1 shows a perspective view of a keyboard extension in an expanded configuration removably containing a portable display device.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a perspective view of a keyboard extension 100 in an expanded configuration and removably containing a portable display device 105.

The portable display device 105 may, for instance, be removably contained in a substantially rectangular display device housing 110. By means of devices such as, but not limited to, a top and bottom clam shell housing the may for instance be held together by a fastening device such as, but not limited to, screws, hinged plastic clips that form part of the display device housing, adhesive tapes, suction cups or magnets or some combination thereof.

The keyboard extension 100 may, for instance, include a first keyboard housing panel 120, a second keyboard housing panel 130 and a second keyboard housing panel 140.

The first keyboard housing panel 120 may, for instance, be a full size, left half of a QWERTY keyboard, while the numeric keypad housing panel 140 may, for instance, be a full size, right half of a QWERTY keyboard. The first and second keyboard housing panels 120, 140 may also be reduced set keyboards as detailed in, for instance, U.S. patent application Ser. No. 11/998,628 filed on Dec. 1, 2007, the contents of which are fully incorporated herein by reference.

Figure 2:
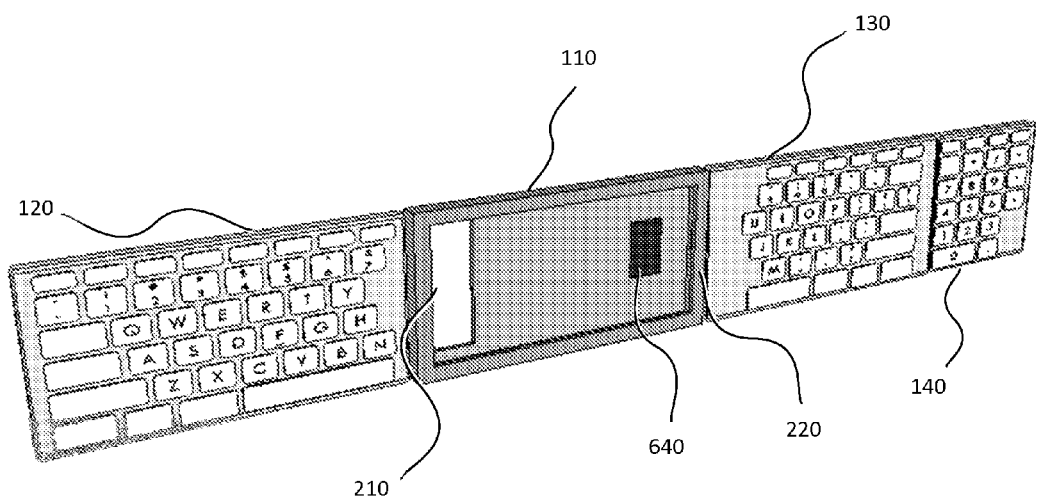
FIG. 2 shows a perspective view of a keyboard extension in an expanded configuration with the portable display device removed.

FIG. 2 shows a perspective view of the keyboard extension 100 in an expanded configuration with the portable display device removed.

In this view, the first keyboard housing panel 120 is shown hingibly connected to a first short side 210 of the substantially rectangular display device housing 110, while a second keyboard housing panel 130 is shown hingibly connected to a second short side 220 of the substantially rectangular display device housing 110. A numeric keypad housing panel 140 is also shown hingeably connected to the second keyboard housing panel 130. One of ordinary skill in the art will readily appreciate that the numeric keypad housing panel 140 may also or instead be connected to the first keyboard housing panel 120.

The substantially rectangular display device housing 110 may also have an electronic module 640 to facilitate communication between the display device housing 110 and the removable, portable display device 105. The electronic module 640 may, for instance, be a wired or wireless communications module such as, but not limited to, to a BlueTooth module, a WiFi module, a USB port or some combination thereof.

Figure 3:
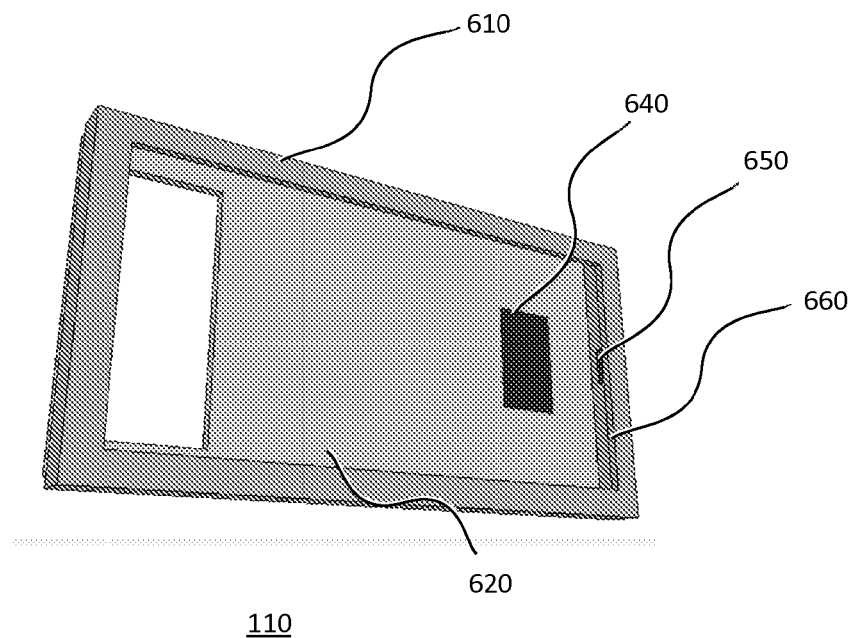
FIG. 3 shows a front perspective view of the support frame and the support platform of the display device housing.

FIG. 3 shows a front perspective view of the support frame 610 and the support platform 620 of the display device housing 110. This view shows the electronic module 640 that may be attached to the support platform 620 and may serve as a wireless communications device between the display device housing 110 and the removable portable display device 105. This view also shows a wired connection port 650 that may be part of the support frame 610 and may be used instead of, or in conjunction with the electronic module 640 to facilitate communication and power sharing between the portable display device 105 and the display device housing 110.

The view of FIG. 3 also shows a lip 660 of the support frame 610. The lip 660 may extend the entire length of the perimeter of the support frame or may only be present at selected portions of the perimeter of the support frame 610.

The lip 660 may serve as the front of a sandwich, or clam shell, that removably retains the portable display device 105.

Figure 4:
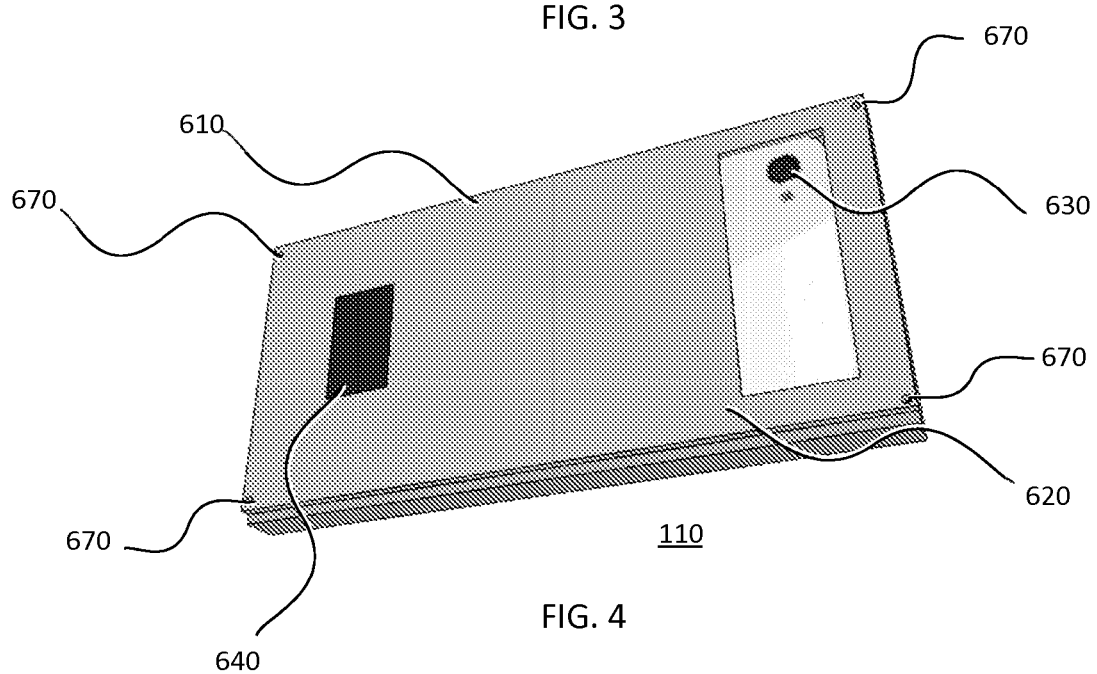
FIG. 4 shows a rear perspective view of the support frame and the support platform of the display device housing.

FIG. 4 shows a rear perspective view of the support frame 610 and the support platform 620 of the display device housing. This view shows how the support platform 620 may be shaped and sized to allow the use of devices on the removable, portable display device 105 such as, but not limited to, the camera 630.

This view also shows how an electronic module 640 may be attached to the support platform 620.

This view also shows a number of securing elements 670. These securing elements 670 may, for instance, be any suitable mechanism such as, but not limited to, screws, pegs, magnets, split pins or some combination thereof.

Figure 5:
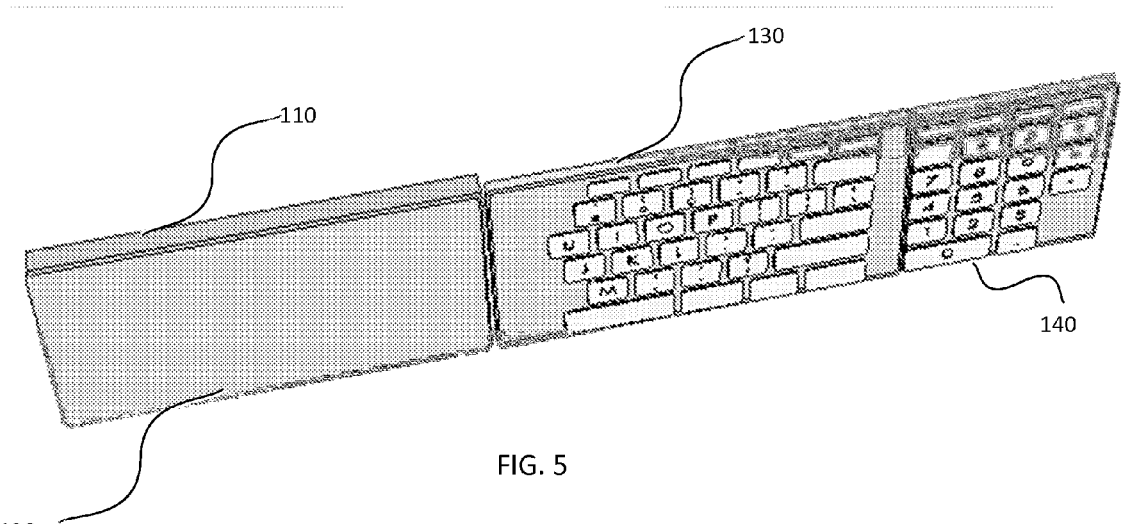
FIG. 5 shows a perspective view of a keyboard extension having one keyboard housing panel folded.

FIG. 5 shows a perspective view of a keyboard extension 100 having one keyboard housing panel 120 folded towards a storage mode rather than a keyboard use mode.

Figure 6:
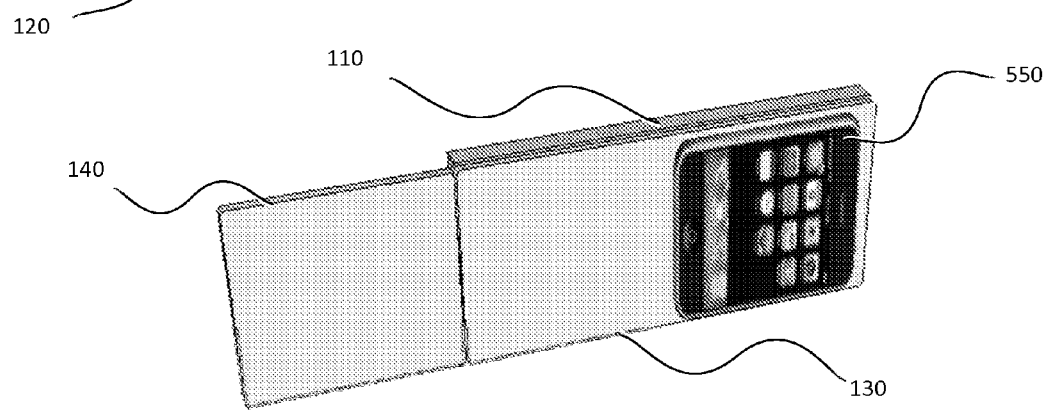
FIG. 6 shows a perspective view of a keyboard extension having both keyboard housing panels folded and a touch screen display visible.

FIG. 6 shows a perspective view of a keyboard extension 100 having both keyboard housing panels 120 and 130 folded and a display 550 visible. The display screen 550 may for instance be a part of one or other of the keyboard housing panels, and may be functionally connected to the removable, portable display device 105 to provide functionality of the portable display device 105. The screen 550 may be optional, but is preferably a part of the keyboard extension 100. The display screen 550, if present, is preferably a conventional LCD, LED or OLED display though it may be a touch screen display. A convention display tends to be less prone to "pocket or butt dialing", i.e., a situation in which a person with a portable device inadvertently dials a number by the keyboard being accidently engaged.

Figure 7:
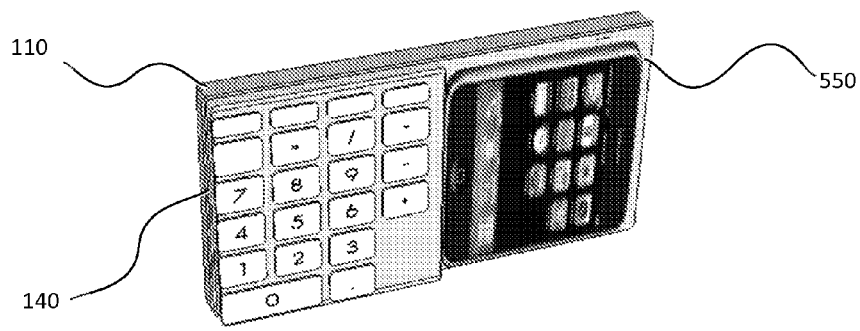
FIG. 7 shows a perspective view of a keyboard extension having both keyboard housing panels and the numeric keyboard folded and a touch screen display screen and a working keyboard visible.

FIG. 7 shows a perspective view of a keyboard extension 100 having both keyboard housing panels and the numeric keyboard folded 140 and a display screen 550 and a working keyboard 140 visible.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A keyboard extension for a portable display device, comprising:
   a substantially rectangular display device housing, shaped and sized to removably house said portable display device and having a first short side and a second short side, and wherein said first display panel covers an area of 80% or more of said display panel housing;
   a first keyboard housing panel, substantially equal in size to said substantially rectangular display device housing and less than 25% larger than said first display panel, and being hingeably connected to said first short side of said substantially rectangular display device housing;
   a second keyboard housing panel, substantially equal in size to said substantially rectangular display device housing and hingeably connected to said second short side of said substantially rectangular display device housing, such that in a first configuration, said keyboard extension for a portable display device functions as a portable display device holder and in a second configuration it functions as a wirelessly connected, split, full size keyboard input to said removable, portable display device, and said second keyboard housing having a substantially constant, rectangular cross-section, and wherein in said first configuration, said substantially rectangular in cross-section, second keyboard is sandwiched between said display panel housing and said first keyboard housing and said substantially rectangular in cross-section, second keyboard separates all parts of said display panel housing from said first keyboard housing by at least the thickness of said substantially rectangular in cross-section second keyboard.

2. The device of claim 1 further comprising a numeric keypad housing panel hingeably connected to a short side of either said first keyboard housing panel or said second keyboard housing panel.

3. The device of claim 2 further comprising functional user access to said numeric keypad 20 housing panel in either said first configuration or said second configuration.

4. The device of claim 1 further comprising a module providing a functional connectivity between said removable, portable display device and said keyboard extension.

5. The device of claim 4 wherein said module comprises a USB port.

6. The device of claim 4 wherein said module comprises a BlueTooth wireless module.

7. The device of claim 1 wherein said support frame is shaped and sized to allow functional use of a camera having a lens located on a rear of said removable, portable display device.

8. The device of claim 1 wherein said support frame is shaped and sized to provide a releasable holding mechanism for said removable, portable display device.

9. The device of claim 8 wherein said releasable hold mechanism comprises one or more screws connecting a support platform to said support frame.

10. The device of claim 8 wherein said releasable hold mechanism comprises one or more spring clips that are integral with said support frame.

* * * * *